Dec. 10, 1968   R. S. JACKSON ET AL   3,416,012
DYNAMIC STRAIN TRANSDUCERS
Filed Oct. 26, 1966

INVENTORS
RONALD STEPHEN JACKSON
CHARLES RICHARDSON MAGUIRE
BY
*Norris & Bateman*
ATTORNEYS 3,416,012
DYNAMIC STRAIN TRANSDUCERS
Ronald Stephen Jackson, Worsley, Manchester, and Charles Richardson Maguire, Sale, England, assignors to Associated Electrical Industries Limited, London, England, a British company
Filed Oct. 26, 1966, Ser. No. 589,653
Claims priority, application Great Britain, Nov. 29, 1965, 50,593/65
10 Claims. (Cl. 310—8.5)

This invention relates to dynamic strain transducers, that is to say transducers which can be used on bodies subject to a dynamic strain, typically a strain occurring at a constant repetitive frequency, and which provide an electrical output, or have an electrical property, which varies in accordance with the magnitude of the dynamic strain.

One use of such a device would be in measuring the dynamic strain in the containing wall of an electrical power transformer, in which wall a cyclic strain is produced at a multiple of the power supply frequency.

An object of the present invention is the provision of a dynamic strain transducer which can be manually held against a body and which is effective to provide an output indicative of the dynamic strain between two points on the body but is little affected by the common component of any vibrational motions which act on both points simultaneously.

According to the present invention, a dynamic strain transducer suitable for being manually held against a workpiece body includes a body of a material having mechanical/electrical transducer properties, two probes extending from this body and terminating in workpiece-engaging tips, suitable electrical connections by which variations in the said transducer properties can be ascertained, and supporting means by which the body can be conveniently handled and by which the tips of the probes can be pressed in a resilient manner into contact with the workpiece so as to partake in cyclic strain movements thereof, the straight line which passes through the tips passing so close to the centre of mass of the body that the transducer is relatively insensitive to vibrational strains arising from the inertia of the body.

The invention will now be described, by way of example, with reference to the accompanying drawings.

Figure 1:
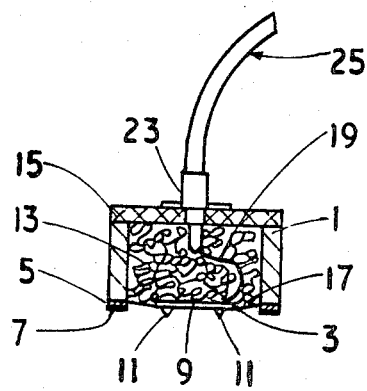
FIGURE 1 is a sectional front elevation of a dynamic strain transducer.
Figure 2:
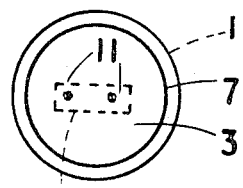
FIGURE 2 is an underneath view of the transducer shown in FIGURE 1.

The transducer includes an outer cylindrical brass case 1 having an outside diameter of 1.25 inch. In the drawings, the case is shown as arranged with its axis vertical, and the lower end of the case is closed by a diaphragm 3 of aluminium foil 0.0005 inch thick held in place by a retaining ring 5. The lower surface of the ring 5 is covered with a thin felt gasket 7, and the diaphragm is assembled with a small amount of sag, i.e., it is not taut. The transducer proper is in the form of a strip 9 of lead-zirconium-titanate ceramic 0.44 inch long, 0.093 inch wide and 0.028 inch thick. This material is a ferro-electric material and is used as the sensing element of a linear strain to be measured. Its opposite faces are provided with thin metallic facings. Two pointed probes 11 are secured to one face of the strip 9 by cementation thereto with epoxy resin. These probes are positioned with their points 0.375 inch apart, and in the specific example were sapphire gramophone styli, with a base to tip length of 0.040 inch.

The strip 9 is lowered into the case 1 from above so that the pointed probes 11 engage the upper surface of the diaghragm 3 and then perforate that diaphragm so that the strip is in engagement with the diaphragm, as shown in FIGURE 1, with the tips of the probes slightly below the felt gasket 7. A plug 13 of fine-cell expanded polyurethane is then inserted into the upper part of the case, this plug being of sufficient size to ensure that when the coverplate 15 is fitted to the case 1 the plug is slightly compressed, forcing the diaphragm 3 taut and causing the styli to be supported in the positions shown. Two electrical leads, 17 and 19 respectively connected to the metallic facings on opposite sides of the strip 9, are connected respectively to the outer conductor (through case 1) and the inner conductor of a coaxial cable socket 23 carried by the cover plate 15 and in use connected to a coaxial cable 25.

Figure 3:
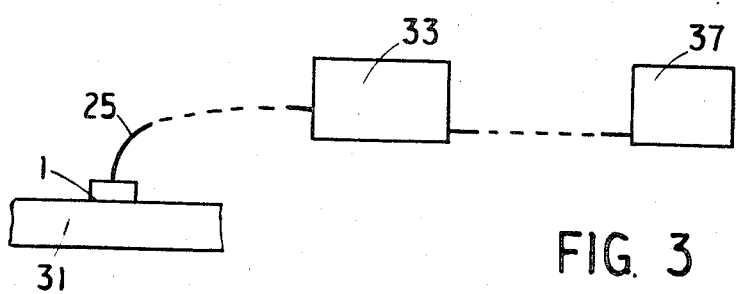

FIGURE 3 illustrates one way in which the strain transducer can be used to provide an indication of the dynamic strain in a metal plate 31. The case 1 is pressed by hand by the operator against the desired part of the plate 31, the felt gasket 7 being compressed and the two pointed probes 11 forming small indentations in the plate 31 by which they are then located. The function of the transducer is to detect relative movements between the two probes 11 along the direction of the line joining their tips. Any such relative movement will stress the strip 9 in a manner producing, by the ferro-electric effect, a charge across the two metallic facings on the opposite faces of the strip, and this charge is applied through the leads 17 and 19 to the coaxial cable 25. It will be appreciated that this charge is produced only during the action of stressing, and therefore only dynamic stresses which produce a charge on the metallic facings provide any effective output. In the case of a plate 31 subjected to stressing as a result of alternating forces at a frequency of 100 cycles per second, and multiples of 100 cycles per second, the output charge will be alternating and proportional to the original strain.

The coaxial cable 25 is connected to a switched filter unit 33 which can be set to any of five settings in which positions it is effective to pass respectively (1) all input frequencies; (2) only a narrow pass band centred on 100 cycles per second; (3), (4), and (5) narrow pass bands centred respectively on 200, 300, and 400 cycles per second. The selected output from the filter is applied to an indicating instrument 37, which suitably is a portable valve voltmeter, and which provides an indication of the magnitude of an alternating electrical input signal, irrespective of its frequency as long as that frequency lies within the linear range of the meter.

The transducer described above is relatively free from response to vibrational bodily motions because of the small mass of the transducer body 9 and the shortness of the styli 11, the straight line joining the tips of which lies very close to the centre of mass of the strip 9. Vibration of the plate 31 will tend to generate a charge in the strip 9 because of the inertia of the strip, but by using a strip of small mass the force needed to accelerate it is small, and the shortness of the styli enable the necessary force to be applied to the strip without the introduction of appreciable, distorting forces. By the use of the resilient plug 13, the probes can be caused to engage the plate 31 without seriously restricting the movement of strip 31 to accommodate vibration of the plate. By the use of the diaphragm 3, which is again slack when the probes are pressed against the plate 31, the strip 9 is located both axially and transversely to a sufficient degree without interfering with its ability to follow vibrations of the plate 31.

The novel transducer thus enables dynamic strains to be examined quickly and cheaply without the use of strain gauges cemented to the surface to be inspected.

By the use of an impact analyser, to which the output of the transducer is applied, it is possible to measure the magnitude of a single change in stress.

When desired, three probes can be used, arranged for example as a right-angled triangle, with the tips of all three lying in a common plane which passes close to the centre of mass of the body. The three probes can be arranged to produce two separate electrical outputs, for example from two separate strips 9 or from a suitably shaped single strip 9, the two outputs providing comparisons of both magnitude and phase of strains in two mutually perpendicular directions on the surface of the body under test.

What we claim is:

1. A dynamic strain transducer suitable for being held manually against a workpiece body and comprising:
    (a) a body of a material having mechanical/electrical transducer properties;
    (b) a first probe extending from this body and terminating in a first workpiece-engaging tip;
    (c) a second probe extending from the body and terminating in a second workpiece-engaging tip;
    (d) electrical connections to the body so as to provide a measure of the electrical properties of the body;
    (e) supporting means by which the body can conveniently be handled;
    (f) resilient means carried by the supporting means and arranged to press the two workpiece-engaging tips outwardly in a resilient manner; and
    (g) the first and second workpiece-engaging tips lying on a straight line which passes so close to the centre of mass of the body that the transducer is relatively insensitive to vibrational strains arising from the inertia of the body.

2. A dynamic strain transducer according to claim 1, in which the base to tip lengths of the probes is about 0.040 inch.

3. A dynamic strain transducer according to claim 1, in which:
    (a) the body of material having mechanical/electrical transducer properties is a strip having a thickness of about 0.028 inch; and
    (b) the probes extend normally from the strip.

4. A dynamic strain transducer according to claim 1, in which:
    (a) the body is a strip of lead-zirconium-titanate ceramic;
    (b) one face of the strip is provided with a first thin metallic facing; and
    (c) the opposite face of the strip is provided with a second thin metallic facing; the two metallic facings with the strip serving as a ferro-electric transducer.

5. A dynamic strain transducer according to claim 4, in which the probes are sapphire gramophone styli cemented to the strip.

6. A dynamic strain transducer according to claim 1, in which:
    (a) a housing is arranged to enclose the body of material having mechanical/electrical transducer properties;
    (b) an aperture is formed in one wall of the housing;
    (c) a diaphragm carried by the housing is arranged to close that aperture;
    (d) a pad of resilient material is arranged to bias the diaphragm outwardly of the housing; and
    (e) the body of material having mechanical/electrical transducer properties is supported by the diaphragm; whereby in use when the probes engage the workpiece body the diaphragm is moved inwardly against the action of the resilient pad and becomes slack so permitting free movement of the probes in the direction of the line joining their tips.

7. A dynamic strain transducer according to claim 6, in which the diaphragm is a thin aluminum foil and the probes pierce and extend through the foil.

8. A dynamic strain transducer according to claim 6, in which the pad of resilient material is a pad of expanded synthetic plastics material.

9. A dynamic strain transducer according to claim 1, in which a third probe is provided and the tips of all three probes lie in a common plane which passes close to the centre of mass of the body of material having mechanical/electrical transducer properties.

10. A dynamic strain transducer according to claim 9, in which the three probes have their tips lying at the vertices of a right-angled triangle.

References Cited

UNITED STATES PATENTS

| | | | |
|---|---|---|---|
| 3,239,696 | 3/1966 | Burkhalter | 310—8.6 |
| 3,200,369 | 8/1965 | Neubauer | 310—9.1 |
| 3,147,169 | 9/1964 | Albertson | 310—9.1 |
| 3,121,326 | 2/1964 | Klatchko | 310—9.1 |
| 2,715,666 | 8/1955 | Stinchfield | 338—2 |
| 2,645,836 | 7/1953 | Sorensen | 310—8.7 |
| 2,558,563 | 6/1951 | Janssen | 310—8.5 |
| 2,494,433 | 1/1950 | Erwin | 310—8.7 |

J. D. MILLER, *Primary Examiner.*

U.S. Cl. X.R.

73—88.5; 310—9.1; 338—2